Patented Dec. 20, 1949

2,491,523

UNITED STATES PATENT OFFICE 2,491,523

CHEMICAL COMPOUNDS AND PROCESSES
FOR PREPARING THEM

John C. Sheehan, Arlington Heights, Mass., and
Max Tishler, Rahway, N. J., assignors to Merck
& Co., Inc., Rahway, N. J., a corporation of New
Jersey No Drawing. Application November 8, 1946,
Serial No. 708,816

17 Claims. (Cl. 260—302)

This invention is concerned generally with novel chemical compounds and with processes for preparing the same; more particularly it relates to alkyl esters of G-penillic and G-isopenillic acids, important intermediates in the synthesis of penicillin, and with intermediate products and processes employed in the synthesis of the same from readily available starting materials. These G-penillic and G-isopenillic esters are further useful in determining the structure of penicillin degradation products, and in establishing the configuration of the penicillins and other organic compounds having antibiotic activity.

G-penillic and G-isopenillic acids have been prepared from penicillin by treatment with dilute aqueous mineral acid, (Science 102, 627–629 (1945)). Prior to applicants' discovery, however, no method existed for synthesizing these acids from readily available starting materials, nor was any method known for preparing applicants' novel alkyl G-penillates and alkyl G-isopenillates.

It has been determined that the dialkyl esters of G-penillic acid, which can be prepared according to the presently invented process, are stereoisomers of 2,2-dimethyl-3,7-dicarboalkoxy-5 - benzyl - 2,3,7,8-tetrahydroimidazo(5,1-b) thiazole. These dialkyl esters of G-penillic acid can be represented by the following generic formula:

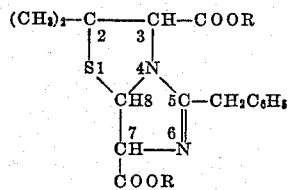

wherein R is an alkyl radical. These esters are isomeric with the corresponding dialkyl esters of G-isopenillic acid, which can be chemically designated as alkyl β-mercapto-α-[2-benzyl-4-carboalkoxy-imidazolyl-1-]-isovalerates. These dialkyl esters of G-isopenillic acid can be represented by the following generic formula:

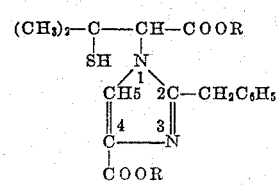

wherein R has the significance above defined.

It is now discovered, in accordance with the present invention, that esters of G-penillic and G-isopenillic acids can be synthesized by reactions indicated generically as follows:

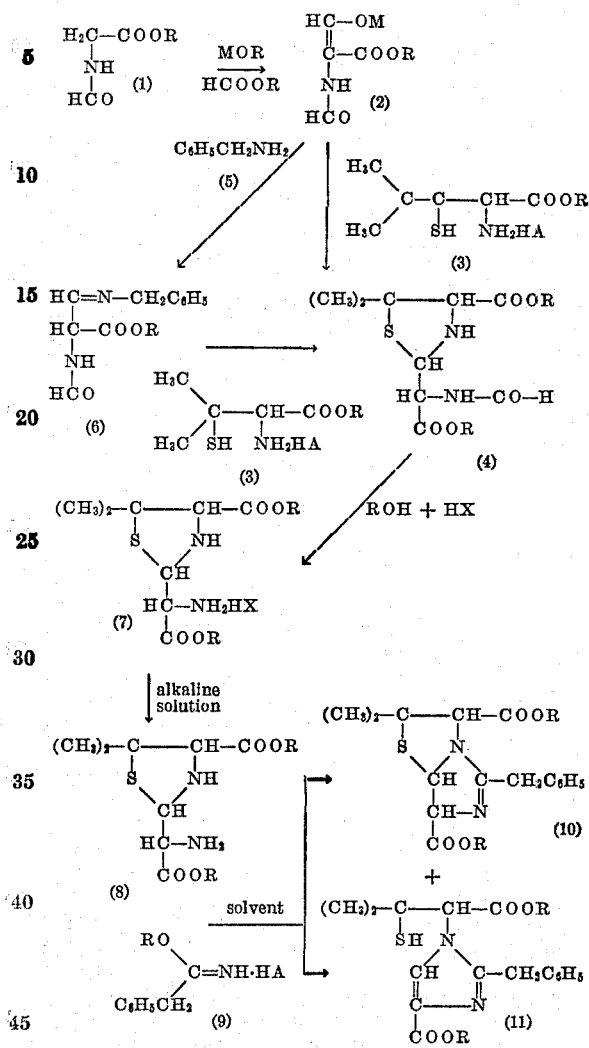

wherein R is an alkyl radical, HX is a hydrogen halide, HA is a mineral acid. The reactions indicated above are conducted as follows: An alkyl ester of N-formyl glycine (1) is reacted with an alkyl formate and an alkali metal alcoholate to produce the corresponding α(metallo-formyl)-N-formyl glycine ester (2); this compound is condensed with a mineral acid salt of an alkyl α-amino-β-mercapto isovalerate (3)

to produce the corresponding 2-(formamido,carboalkoxy-methyl) - 4-carboalkoxy- 5,5-dimethyl-thiazolidine (4). Alternatively, the metalloformyl-N-formyl glycine ester (2) can be reacted with benzylamine (5) to form the corresponding alkyl α-formamido-β-benzylimino-propionate (6), and this condensation product is then reacted with said mineral acid salt of an alkyl α-amino-β-mercapto isovaleric ester (3) to produce the 2-(formamido,carboalkoxy-methyl) - 4 - carboalkoxy - 5,5-dimethyl-thiazolidine (4). This thiazolidine compound is subjected to partial hydrolysis or alcoholysis whereby the formamido group is hydrolyzed without affecting the ester linkages to produce the corresponding ester of the amine hydrohalide (7). This compound is then reacted with a weakly alkaline solution to produce the 2-(amino,carboalkoxy-methyl) - 4-carboalkoxy - 5,5 - dimethyl-thiazolidine (8). When this compound is reacted with a mineral acid salt of a phenacetimino-ether (9), the product obtained comprises an ester of G-penillic acid (10) admixed with the corresponding ester of G-isopenillic acid (11).

The present invention is concerned with 2 - (formamido,carboalkoxy - methyl) - 4- carboalkoxy-5,5-dimethyl-thiazolidines (intermediate (4) above) and the corresponding de-formylated derivatives (7) and with processes for preparing these compounds from the readily available N-formyl glyciné ester starting material (1). The de-formylated derivatives above referred to, namely, the 2-(amino,carboalkoxy-methyl) - 4-carboalkoxy - 5,5-dimethyl - thiazolidines (7) are converted to corresponding esters of G-penillic acid (10) and G-isopenillic acid (11) as indicated above and described in detail in our co-pending application Serial No. 708,817, filed November 8, 1946.

In carrying out the presently invented process, an alkyl ester of N-formyl glycine, as for example, methyl-α-formamido-acetate, ethyl α-formamido acetate, propyl α-formamido-acetate, or amyl α-formamido-acetate, is reacted with an alkyl formate such as methyl formate, ethyl formate, butyl formate, and the like, in the presence of an alkali metal alcoholate such as sodium methylate, potassium ethylate, and the like. The reaction is conveniently conducted in the presence of a hydrocarbon solvent such as benzene, toluene, and the like, but it is to be understood that the invention is not to be confined to these solvents. The reaction is readily controlled by adding the alkali metal alcoholate, or a suspension thereof in the hydrocarbon solvent, portionwise to a solution containing the N-formyl glycine ester and an alkyl formate. The reaction mixture is best agitated vigorously during the addition, during which the temperature is preferably maintained at about 5–10° C.; the time required for addition varies depending on the equipment and components used, from approximately 15 minutes to several hours. The reaction mixture is then allowed to stand for several hours at about 0–5° C. whereby the reaction product separates as a gum. This product is recovered by any convenient means as, for example, by decantation and is conveniently purified by trituration with a solvent such as ether.

This partially purified alkyl ester of α-(metallo-formyl)-N-formyl glycine is then reacted with a mineral acid salt of an alkyl α-amino-β-mercapto-isovalerate, such as the methyl ester of penicillamine hydrochloride, the ethyl ester of penicillamine hydrochloride, the butyl ester of penicillamine hydrochloride, the propyl ester of penicillamine sulfate, the methyl ester of d-penicillamine hydrochloride, and the like. The reaction is conveniently conducted in aqueous solution. It is presently preferred to employ an aqueous solution containing a minor proportion of acetic acid and to conduct the reaction at a temperature of approximately 20° C., although higher temperatures can be employed if desired. When the reaction is carried out at a temperature of about 20° C., the reaction is substantially complete in about 15 minutes, and the product is isolated from the reaction mixture as, for example, by evaporating the aqueous solution, or preferably, by extracting said aqueous solution with a solvent such a chloroform, ethylene dichloride, methylene chloride, and the like. Evaporation of the non-aqueous extract yields the desired 2-(formamido,carboalkoxy-methyl)-4-carboalkoxy-5,5-dimethyl thiazolidine, which can be represented by the generic formula:

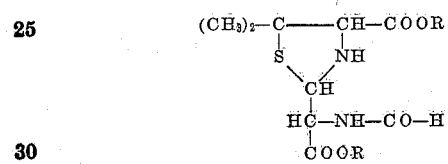

wherein R is an alkyl radical.

Alternatively, the α - (metallo-formyl) - N-formyl glycine ester, prepared as previously described, is reacted with benzylamine, to produce the corresponding ester of α-formamido-β-benzylimino-propionic acid. This reaction is best carried out by dissolving the α-(metalloformyl)-N-formyl glycine ester in a cold aqueous acid solution containing a mineral acid such as hydrochloric acid, sulfuric acid, hydrobromic acid, and the like. The pH of the solution should be less than about 3 and the temperature below about 5° C. The benzylamine is added to the cold aqueous solution and the resulting solution allowed to warm to about 20–25° C. and is maintained at this temperature until the reaction is substantially complete. When α-(sodio-formyl)-N-formyl glycine methyl ester and benzylamine are reacted in aqueous hydrochloric acid solution having a pH of approximately 3, the time required for the reaction is about 15 to 20 hours. The product of the reaction of the α-metallo-N-formyl glycine ester with benzylamine generally separates from the aqueous mixture as an oil and can be separated directly, if desired, but is preferably extracted by means of a water-immiscible solvent such as chloroform, ethylene dichloride, benzene, ether, and the like. The extract is dried and evaporated to dryness and the residual material is purified by recrystallization from a solvent such as diethyl ether, dipropyl ether and the like to produce substantially pure alkyl α-formamido-β-benzylimino-propionate.

The alkyl α-formamido-β-benzylimino-propionate is then reacted with a mineral acid salt of an alkyl α-amino-β-mercapto-isovalerate in a manner similar to that described for the α-(metalloformyl)-N-formyl-glycine ester precursor. However, the condensation product is best dissolved in a quantity of a water-miscible solvent, such as a lower aliphatic alcohol or ketone, sufficient so that the compound will remain in solution when it is admixed with the aqueous solution containing the salt of the alkyl α-amino-β-mercapto-isovalerate. Since the reaction proceeds more slowly in the case of the alkyl α-formamido-β-benzylimino-propionate than in the case of the α-metallo derivative, it has been found best to heat the homogeneous solution of the reactants at a temperature of about 70° C., or higher, although lower temperatures may be employed if desired. (When methyl α-formamido-β-benzylimino-propionate is reacted with penicillamine methyl ester hydrochloride in aqueous methanol at a temperature of about 70° C., the condensation is substantially complete in approximately 15 minutes.) The thiazolidine product is isolated from the reaction solution as, for example, by extracting said aqueous solution with a water-immiscible organic solvent such as chloroform, ethylene dichloride, benzene, ether, and the like and the non-aqueous extract dried and evaporated to produce the desired 2-(formamido,carboalkoxy-methyl)-4-carboalkoxy-5,5-dimethyl-thiazolidine which can be represented by the generic formula:

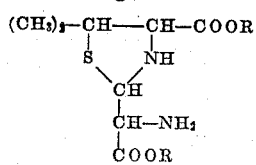

wherein R is an alkyl radical.

The formamido-thiazolidine compound prepared above is then deformylated without effecting hydrolysis of the ester linkages. This can be accomplished by various procedures as, for example, by dissolving the product in an anhydrous aliphatic alcoholic hydrohalic acid solution such as methanolic hydrogen chloride, ethanolic hydrogen bromide, ethanolic hydrogen chloride, and the like, and allowing the resulting solution to stand at a temperature below about 15° C. for a time sufficient to effect hydrolysis of the formamido linkage. Since the anhydrous alcoholic hydrohalic acid solution is itself an esterifying agent, no hydrolysis of the ester linkage occurs during the reaction, although an ester interchange may take place, in the event that the alcohol employed is different than that corresponding to the alkyl radicals present in the ester groupings of the thiazolidine compound. The acidic alcohol reaction solution is then evaporated, preferably under reduced pressure, whereby the excess hydrogen halide is removed to produce the substantially pure hydrogen halide salt of 2-(amino,carboalkoxy-methyl)-4-carboalkoxy-5,5-dimethyl-thiazolidine. This compound is converted to the free amine, again without affecting the ester linkages, by dissolving said hydrogen halide salt in a solvent such as an aliphatic alcohol and the solution poured into a mildly alkaline aqueous solution containing, for example, potassium carbonate, sodium carbonate, and the like, whereby the hydrogen halide is neutralized and the free amine-thiazolidine compound is recovered, either by evaporating the aqueous solution and extracting the residue or by directly extracting the aqueous solution by means of a water-immiscible solvent such as benzene, toluene, chloroform, ether, ethylene dichloride, and the like. The resulting extract is then dried and evaporated under reduced pressure to produce a viscous syrup which can be further purified, if desired, by molecular distillation to produce the corresponding diester of 2-(amino,carboxy-methyl)-4-carboxy-5,5-dimethyl-thiazolidine represented by the formula

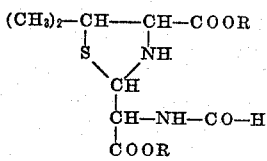

wherein R is an alkyl radical.

The following examples illustrate methods of carrying out the present invention, but it is to be understood that these examples are given by way of illustration and not of limitation.

Example 1

About 25 g. of d-penicillamine hydrochloride is dissolved in about 400 ml. of methanol containing about 120 g. anhydrous hydrogen chloride and about 29.5 g. of dimethyl sulfite. The solution is refluxed for approximately 20 hours, at which time sulfur dioxide may still be detected in the exit gases by means of iodine indicator paper. About 100 cc. of benzene is added to this solution, and the resulting solution evaporated to dryness under reduced pressure and at a temperature of approximately 70° C. The crude product (M. P. 169° C. with decomposition) which weighs approximately 23.5 g., is slurried in approximately 200 cc. of hot tertiary butyl alcohol and the slurry filtered to produce approximately 21 g. of substantially pure d-penicillamine hydrochloride methyl ester; M. P. 184° C. (with decomposition); yield approximately 75% of theory.

About 400 g. of N-formyl-glycine methyl ester is dissolved in about 1130 cc. of methyl formate. A suspension of about 185 g. of sodium methylate in about 2150 cc. benzene is added to this solution over a period of approximately 45 minutes, during which time the reaction mixture is stirred vigorously and the temperature is maintained at approximately 5–10° C. The reaction mixture is allowed to stand at approximately 0–5° C. for about 16 hours, at the end of which time a dark yellow gummy precipitate settles out. The supernatant liquid is decanted therefrom, triturated with about 3 l. of anhydrous ether and the product is removed by filtration quickly and placed in a desiccator and dried to produce approximately 622 g. of impure α-(sodio-formyl)-N-formyl glycine methyl ester.

About 7 g. of α-(sodio-formyl)-N-formyl glycine methyl ester is dissolved in about 15 cc. of water containing about 1.5 cc of glacial acetic acid. This solution is added to a solution containing about 5 g. of d-penicillamine methyl ester hydrochloride, dissolved in about 7 cc. water. The resulting solution is allowed to stand at room temperature for approximately 15 minutes and the oil is then extracted 5 times with approximately 50 cc. portions of chloroform. The chloroform extracts are dried with anhydrous sodium sulfate, filtered and the filtrate evaporated under reduced pressure to produce approximately 6.0 g. of 2-(formamido,carbomethoxy-methyl)-4-carbomethoxy-5,5-dimethyl-thiazolidine.

Example 2

About 200 g. of α-(sodio-formyl)-N-formyl glycine methyl ester is dissolved in about 1000 cc. of ice water (0–5° C.) and the solution is acidified to a pH of approximately 3 with concentrated hydrochloric acid. About 140 g. of benzylamine is added to this cold solution and the homogeneous solution which results is allowed to stand for approximately 16 hours at about 25° C. The oil which separates is extracted with four portions containing approximately 250 cc. of chloroform and the chloroform extracts are dried with anhydrous sodium sulfate, filtered and the chloroform evaporated under reduced pressure. The residual oil is dissolved in approximately 1 liter of ether while still warm, and the solution is cooled to about 0° C., whereupon the product crystallizes and is recovered by filtration and dried to produce approximately 47.5 g. of substantially pure methyl α-formamido-β-benzyl-imino-propionate M. P. 108–109° C.; yield including second crop material obtained by evaporation of the ether mother liquor equals approximately 35% theory.

About 41.1 g. of d-penicillamine methyl ester hydrochloride is dissolved in about 80 cc. of water and the solution is added to a solution containing about 48.5 g. of methyl α-formamido-β-benzylimino-propionate dissolved in about 100 cc. of warm methanol. The resulting homogeneous solution is heated at about 70° C. for approximately 15 minutes and is then cooled and extracted five times with approximately 125 cc. portions of benzene. The benzene extracts are dried with anhydrous sodium sulfate, filtered, and the benzene evaporated to dryness under reduced pressure to produce approximately 48.0 g. of 2-(formamido carbomethoxy - methyl) - 4 - carbomethoxy-5,5-dimethyl-thiazolidine.

*Example 3*

About 48.0 g. of 2-(formamido,carbomethoxy-methyl)-4-carbomethoxy-5,5-dimethyl-thiazolidine which can be prepared as described in either Example 1 or 2, is dissolved in about 160 cc. methanol and the solution is added to a solution containing about 160 cc. of a 17% solution of anhydrous hydrogen chloride dissolved in methanol, using external cooling to keep the temperature below about 10° C. during the mixing. The resulting solution is allowed to stand for approximately 16 hours at about 0–5° C. The methanol and excess hydrogen chloride are removed by evaporating under reduced pressure at 5° C. to produce the hydrochloride of 2-(amino, carbomethoxy-methyl)-4-carbomethoxy-5,5-dimethyl-thiazolidine in substantially pure form.

*Example 4*

About 45.0 gms. of 2-(amino,carbomethoxy-methyl)-4-carbomethoxy-5,5-dimethyl-thiazolidine hydrochloride (which can be prepared as described in Example 3) is dissolved in approximately 50 cc. of methanol. This solution is poured slowly into a cold well-stirred solution containing about 50 g. of potassium bicarbonate dissolved in about 200 cc. of water. This solution is then extracted with five portions containing about 100 cc. of benzene; the benzene solution is dried with anhydrous sodium sulfate, filtered, and the benzene evaporated under reduced pressure to produce approximately 32.5 g. of a viscous syrup which is purified by distillation in a molecular still at a pressure of about .1 to 1.0 microns to produce substantially pure 2-(amino,carbomethoxy-methyl)-4-carbomethoxy-5,5-dimethyl-thiazolidine, B. P. 100–105° C. at about .1 micron.

Modifications may be made in carrying out the present invention without departing from the spirit and scope thereof and the invention is to be limited only by the appended claims.

We claim:

1. The process which comprises reacting a compound selected from the class which consists of alkyl esters of α-(metallo-formyl)-N-formyl-glycine and alkyl α-formamido-β-benzylimino-propionates, with a compound selected from the class which consists of alkyl α-amino-β-mercapto-isovalerates and mineral acid salts thereof, to produce a 2(formamido,carboalkoxy-methyl)-4-carboalkoxy-5,5 - dimethyl - thiazolidine; and partially hydrolyzing this compound to produce the corresponding 2-(amino,carboalkoxy-methyl)-4-carboalkoxy-5,5-dimethyl-thiazolidine.

2. The process which comprises reacting an alkyl ester of α-(metallo-formyl)-N-formyl-glycine with a mineral acid salt of an alkyl α-amino-β-mercapto-isovalerate to produce the corresponding 2 - (formamido,carboalkoxy-methyl) - 4-carboalkoxy-5,5-dimethyl-thiazolidine, and reacting this compound with an agent capable of effecting hydrolysis of the formamido linkage without at the same time saponifying the ester groupings to produce the corresponding 2-(amino,carboalkoxy-methyl) - 4 - carboalkoxy-5,5-dimethyl-thiazolidine.

3. The process which comprises reacting an alkyl α-formamido-β-benzylimino-propionate with a mineral acid salt of an alkyl α-amino-β-mercapto-isovalerate to produce the corresponding 2 - (formamido,carboalkoxy - methyl) -4-carboalkoxy-5,5-dimethyl-thiazolidine, and reacting this compound with an agent capable of effecting hydrolysis of the formamido linkage without at the same time saponifying the ester groupings to produce the corresponding 2-(amino,carboalkoxy-methyl) - 4 - carboalkoxy-5,5-dimethyl-thiazolidine.

4. The process which comprises reacting the methyl ester of α-(sodio-formyl)-N-formyl glycine with the methyl ester of d-penicillamine hydrochloride to produce 2-(formamido,carbomethoxy - methyl) - 4-carbomethoxy-5,5-dimethyl-thiazolidine, and deformylating without hydrolzying the ester linkages by reacting said thiazolidine compound with a substantially anhydrous methanol solution of hydrogen chloride to produce the hydrogen chloride salt of 2-(amino,-carbomethoxy-methyl) - 4-carbomethoxy-5,5-dimethyl-thiazolidine.

5. The process which comprises reacting the methyl ester of α-(sodio-formyl)-N-formyl glycine with benzylamine to produce methyl α-formamido-β-benzylimino-propionate, and reacting this compound with the methyl ester of d-penicillamine hydrochloride to produce 2-(formamido,carbomethoxy - methyl)-4-carbomethoxy-5,5-dimethyl-thiazolidine.

6. The process which comprises reacting an alkyl ester of α-(metallo formyl)-N-formyl-glycine with a mineral acid salt of an alkyl α-amino-β-mercapto-isovalerate to produce the corresponding 2-(formamido,carboalkoxy-methyl)-4-carboalkoxy-5,5-dimethyl-thiazolidine.

7. The process which comprises reacting the methyl ester of α-(sodio-formyl)-N-formyl glycine with the methyl ester of d-penicillamine hydrochloride to produce 2-(formamido,carbomethoxy-methyl)-4-carbomethoxy-5,5-dimethyl - thiazolidine.

8. The process which comprises reacting an alkyl α - formamido - β-benzylimino-propionate with a mineral acid salt of an alkyl α-amino-β-mercapto-isovalerate to produce the corresponding 2 - (formamido,carboalkoxy - methyl) -4-carboalkoxy-5,5-dimethyl-thiazolidine.

9. The process which comprises reacting methyl α-formamido-β-benzylimino-propionate with the methyl ester of penicillamine hydrochloride to produce 2-(formamido,carbomethoxy-methyl) - 4-carbomethoxy-5,5-dimethyl-thiazolidine.

10. The process which comprises reacting 2 - (formamido,carboalkoxy-methyl)-4-carboalkoxy-5,5-dimethyl-thiazolidine with an agent capable of hydrolyzing the formamido grouping without affecting the ester linkages to produce the corresponding 2-(amino,carboalkoxy-methyl)-4-carboalkoxy-5,5-dimethyl-thiazolidine.

11. The process of de-formylating 2-(formamido,carbomethoxy - methyl)-4-carbomethoxy-5,5-dimethyl-thiazolidine without affecting hydrolysis of the ester linkages which comprises reacting said thiazolidine compound with a substantially anhydrous solution of a hydrogen halide in an aliphatic alcohol to produce the corresponding hydrogen halide salt of 2-(amino,-carbomethoxy - methyl)-4-carbomethoxy-5,5-dimethyl-thiazolidine.

12. The process of de-formylating 2-formamido,carbomethoxy - methyl)-4-carbomethoxy-5,5-dimethyl-thiazolidine without effecting hydrolysis of the ester linkages which comprises reacting said thiazolidine compound with a substantially anhydrous methanol solution of hydrogen chloride to produce the hydrogen halide salt of the de-formylated thiazolidine compound, and reacting this salt with a mildly alkaline aqueous solution to produce the 2-(amino-carbomethoxy - methyl) - 4 - carbomethoxy-5,5-dimethyl-thiazolidine.

13. The process of preparing 2-(amino,carboalkoxy - methyl)-4-carboalkoxy-5,5-dimethyl-thiazolidines which comprises reacting a compound selected from the class which consists of lower alkyl esters of α-(metallo-formyl)-N-formyl-glycine and lower alkyl esters of α-formamido-β-benzylimino-propionic acid, with a compound selected from the class which consists of lower alkyl esters of α-amino-β-mercapto-isovaleric acid and mineral acid salts thereof, reacting the compound thus obtained with an anhydrous alcohol solution of a hydrogen halide thereby partially hydrolyzing said compound, and treating the resulting product with a weakly alkaline solution.

14. A compound selected from the class which consists of compounds having the formula:

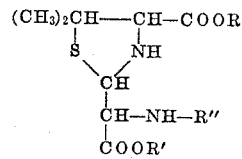

wherein R and R' are lower alkyl radicals, R'' is a radical selected from the class which consists of hydrogen and formyl radicals, and salts thereof.

15. 2 - (amino,carbomethoxy-methyl)-4-carbomethoxy-5,5-dimethyl-thiazolidine.

16. 2 - (amino,carbomethoxy-methyl)-4-carbomethoxy-5,5-dimethyl-thiazolidine hydrochloride.

17. 2 - (formamido,carbomethoxy - methyl)-4-carbomethoxy-5,5-dimethyl-thiazolidine.

JOHN C. SHEEHAN.
MAX TISHLER.

REFERENCES CITED

The following references are of record in the file of this patent:

UNITED STATES PATENTS

| Number | Name | Date |
| --- | --- | --- |
| 2,135,641 | Jacobson | Nov. 8, 1938 |
| 2,148,909 | Maier | Feb. 28, 1939 |
| 2,293,026 | Day et al. | Aug. 18, 1942 |
| 2,394,967 | Kushner | Feb. 12, 1946 |

OTHER REFERENCES

Lilly: Report on Penicillin—L–14, Oct. 15, 1944, pp. 14–15.

Squibb: Report on Penicillin—S–35, Jan. 2, 1945, pp. 6–8.